United States Patent [19]

Squires et al.

[11] Patent Number: 4,619,706

[45] Date of Patent: Oct. 28, 1986

[54] METHOD FOR STRIPPING ORGANIC COATINGS FROM SUBSTRATES

[75] Inventors: David G. Squires; Lloyd Hundley, both of Cincinnati; Raymond A. Barry, Powell, all of Ohio

[73] Assignee: Texo Corporation, Cincinnati, Ohio

[21] Appl. No.: 779,562

[22] Filed: Sep. 24, 1985

Related U.S. Application Data

[63] Continuation-in-part of Ser. No. 706,475, Feb. 28, 1985, abandoned.

[51] Int. Cl.[4] ................................................. C23G 1/00
[52] U.S. Cl. .......................................... 134/2; 134/35; 134/36; 134/38; 134/40; 252/158
[58] Field of Search .................. 134/2, 29, 35, 36, 38, 134/40; 252/139, 158

[56] References Cited

U.S. PATENT DOCUMENTS

| | | | |
|---|---|---|---|
| 2,389,488 | 11/1945 | Dailey | 134/36 X |
| 2,653,883 | 9/1953 | Thomas | 134/36 X |
| 3,085,918 | 4/1963 | Sherliker et al. | 134/40 X |
| 3,094,469 | 6/1963 | Strauss et al. | 134/40 X |
| 3,615,827 | 10/1971 | Murphy | 134/38 |
| 3,766,076 | 10/1973 | Murphy | 134/38 X |
| 3,796,602 | 3/1974 | Briney et al. | 134/38 |
| 3,888,693 | 6/1975 | Schevey et al. | 134/36 X |

*Primary Examiner*—Arthur L. Corbin
*Attorney, Agent, or Firm*—Francis T. Kremblas, Jr.

[57] ABSTRACT

A di-phase stripping composition is disclosed wherein an aqueous phase having a non-aqueous solvent phase dispersed therein is employed to provide significantly improved effectiveness to remove a wide variety of organic coatings from substrates coated therewith. The aqueous phase preferably includes alkaline components and the organic solvent phase comprises a glycol phenol ether or ethoxylated furfuryl alcohol alone or in combination. Other additives can be used effectively to improve the stripping action such as surfactants, chelates and/or sequesterants and dispersants.

6 Claims, No Drawings

METHOD FOR STRIPPING ORGANIC COATINGS FROM SUBSTRATES

This application is a continuation in part of our co-pending application Ser. No. 706,475, filed Feb. 28, 1985, now abandoned.

BACKGROUND OF THE INVENTION

There are many stripping compositions known in the prior art for removing organic coatings from substrates coated therewith. The simplest form of such stripping formulations comprise an aqueous alkaline composition. It is well-known that additional advantages can be obtained by adding various organic components to the alkaline composition in a formulation which is combined to form a single aqueous phase applicable for certain types of coatings. Disclosed in these prior art compositions are such components as tetrahydrofurfuryl alcohol, ethoxylated furfuryl alcohols, ethoxylated alkyl phenols and the like in various combinations. However, such prior stripping compositions are formulated into a single aqueous phase by the addition of coupling agents which assure that the organic solvents are soluble in the aqueous phase.

An example of such single phase aqueous compositions is disclosed in U.S. Pat. No. 3,615,827 to Murphy wherein ethylene glycol monophenyl ether is coupled into solution with an alkaline aqueous solution by the addition of a polyalkylene glycol. Murphy suggests an excess of the organic additives to be used, but only to form a slight oil slick as merely an indicator that the aqueous alkaline solution is saturated with the organic solvent.

In view of the relatively high cost of these organic solvents compared to alkaline components, combining solvents into a single aqueous phase with alkaline components has been considered the most practical and cost effective manner to achieve better stripping action than merely using an aqueous alkaline solution or pure organic solvents by themselves. In many instances, it is typical that these compositions are employed most effectively at elevated temperatures and are referred to as "hot" stripping agents.

Other prior art compositions include components which are less than desirable from an environmental or waste treatment consideration such as phenol, cresylic acid and chlorinated solvents such as suggested by U.S. Pat. No. 3,094,469 to Strauss et al. There has been significant activity over a long period of time searching for a more effective stripping composition, which does not include environmentally hazardous components, to strip organic coatings from substrates in a commercially efficient and more economical manner.

SUMMARY OF THE INVENTION

The present invention relates generally to stripping compositions for removing organic coatings from substrates coated therewith and particularly to a novel formulation comprising a di-phase system employing an organic solvent phase, not soluble in water, which is dispersed in an aqueous phase system. In accordance with the present invention, it has been discovered that this two-phase system has a surprising and significantly greater effectiveness than a single aqueous phase system wherein the solvent phase is dissolved or made miscible in the aqueous phase such as taught by the prior art.

The organic solvent phase of the present invention comprises a glycol phenol ether or an ethoxylated furfuryl alcohol or a combination of these organic solvents.

It has been discovered that maintaining a two-phase dispersion of the disclosed composition significantly increases the effectiveness of the stripping action. This suggests that maintaining the two separate phases in a dispersed form in agitated contact with the coating provides a separate repetitive attack upon the coating by each phase which enhances removal of the coating compared to prior single phase formulations containing the alkaline and organic components coupled in an aqueous solution.

Typically, a rolling boil of the di-phase composition works well to provide the necessary agitation to maintain a good dispersion of the two phases in engagement with the coated substrate, however, mechanical mixing, air agitation, recirculation or other forms of agitation also can function to maintain a good dispersion of the two phases.

Generally, alkaline materials are added to the water phase to aid in conditioning the surface and penetration of the coating by the solvent phase. The choice of alkaline materials generally is based upon the substrate material which carries the organic coating.

Chelates and/or sequesterants may also be added to the water phase to conventionally aid penetration of the coating, prevent metal precipation, improve rinsing, and when necessary, remove light rust. In a similar manner, surfactants may be added to improve penetration of the coating and rinsing. Dispersants may be used to help maintain optimum dispersion of the solvent phase in the aqueous phase.

OBJECTS

It is therefore a primary object of the present invention to provide a two-phase stripping composition wherein a separate and distinct solvent phase is dispersed in an aqueous phase to more effectively remove a wide range of organic coatings from coated substrates.

It is another object of the present invention to provide a di-phase stripping composition of the type described which does not include hazardous components which pose significant environmental and/or waste treatment problems.

It is a further object of the present invention to provide a method of stripping organic coatings from substrates utilizing a glycol phenol ether or an exthoxylated furfuryl alcohol or a combination thereof to form a non-water soluble solvent phase which may be dispersed in an aqueous phase by agitation to form a di-phase stripping composition wherein each of the two phases in the dispersion are attacking the coating to be removed in a random, individual and repetitive manner.

DETAILED DESCRIPTION

The present invention relates to stripping composition and a method for removal of organic coatings and specifically to a novel two-phase stripping system wherein a solvent phase, not soluble in water, is dispersed in an aqueous phase and contacted with the coating to be removed.

In accordance with the present invention, a glycol phenol ether or an ethoxylated furfuryl alcohol, alone or in combination with one another, form the solvent phase which is dispersed in an aqueous phase, but not dissolved or emulsified therein. This two-phase system has been found to have significantly improved effectiveness over the prior art formulations consisting of a single aqueous phase having one or more various organic solvent materials coupled in solution in the aqueous phase. The dispersion of the two-phase formulation of the present invention may be maintained by agitation accomplished by heating the bath to a rolling boil or by mechanical or air agitation. A good dispersion of the two phases is very important to achieve satisfactory enhanced effectiveness in accordance with the present invention.

The aqueous phase preferably includes alkaline materials to condition the surface of the coating and aid in penetration of the solvent phase. Other ingredients may be added to the water phase such as chelates, sequesterants and surfactants for conventional purposes including improving the penetration of the organic coating and for rinsing purposes. Dispersants may be employed to maintain an optimum dispersion of the solvent phase in the aqueous phase during agitation thereof as deemed applicable.

In order to obtain the improved results noted herein, it is essential that the integrity of the two-phase system be maintained, therefore coupling of the solvent and aqueous phases wherein the solvent phase is dissolved or emulsified within the aqueous phase should be avoided.

As used herein, a two-phase or di-phase system is a system wherein separation of the two phases occurs relatively quickly when the two phases are in the static state. Therefore, the essentially non-soluble organic phase, in accordance with the present invention, will separate quickly from the aqueous phase when agitation ceases. While surfactants are typically helpful in the present formulation for conventional purposes, an amount which tends to cause the organic phase to become water miscible or soluble in the aqueous phase tends to defeat the dual action obtained by the two phases each attacking the coating individually in a relatively pure state in the agitated dispersed form. Depending upon the type of coating to be removed, the preferred amount of the solvent phase should range between about 50 to 150 grams per liter of the total composition to assure that a sufficient amount of the solvent phase is present in the dispersion to obtain the accelerated effectiveness noted herein. Generally with good dispersion, amounts greater than about 150 grams per liter have not significantly increased the stripping effectiveness in most applications to justify the increase in cost of the additional organic solvent. Amounts less than about 50 grams per liter may present problems in obtaining the optimum dispersion with conventional agitation methods. However, with appropriate agitation, as little as 20 grams per liter can be effectively employed in some applications.

The formulation according to the present invention has been found to be superior over conventional single phase stripping formulations comprising organic solvents coupled in an aqueous solution as typically used for many of the more modern and very difficult to remove coatings. Such coatings include epoxy powders, epoxy high solids, polyesters, acrylics, melamines and polyurethanes.

Formulations for stripping composition in accordance with the present invention, depending upon the nature and type of coating to be removed, may fall within the following ranges given as grams per liter of the total composition

| Components | Grams per liter |
| --- | --- |
| Alkaline Components | 0–300 |
| Sequesterant of Chelate | 0–50 |
| Dispersant | 0–50 |
| Surfactant | 0–50 |
| Ethoxylated furfuryl alcohol | 20–500 |
| Water | Balance |

The alkaline components for the more difficult to remove coatings is generally preferred in a range of 50 to 300 grams per liter. The organic solvent phase comprising glycol phenol ether or ethoxylated furfuryl alcohol, preferably is provided in the range of 50 to 150 grams per liter.

The sequestrant or chelate, dispersant and surfactant are preferred in relatively smaller amount of 0.5 to 15 grams per liter. While typically very helpful in the same sense as conventionally employed in prior art stripping compositions, they are not essential to obtain comparably improved results within the spirit of the present invention.

Since there are a very wide variety of coatings, such as previously mentioned, and other variables to any commerical application, the percentages of the alkaline aqueous phase and the organic solvent phase, may be varied within relatively wide ranges and still obtain very good results relative to the contact time necessary to remove the coating. Generally the variables which determine the contact time required include the type and thickness of the coating, the temperature of the stripping bath, bath composition, and in applications wherein the coating is removed primarily by dissolution in the bath, the amount of coated substrates which have previously been stripped in the bath. Tests results on various coatings have illustrated that di-phase compositions formulated in accordance with the present inventions have performed complete removal of coatings three to ten times faster than conventional single phase stripper compositions including those containing glycol phenol ethers or ethoxylated furfuryl alcohol coupled into solution with the aqueous alkaline phase.

Depending upon the nature of the coating and the substrate, improved results may be achieved using one or the other of the base solvents disclosed herein as the primary component of the solvent phase in di-phase formulations of the present invention. For example, formulations made in accordance with Example IV appear to be more effective in stripping powder mist coatings than the formulation in Example VII. However, either type of di-phase formulation shows much improved results in any such application compared to prior art compositions which couple the organic solvents into solution with the aqueous phase. cEXAMPLE I As one example of a drammatic nature, the following di-phase composition was employed to remove a polyurethane coating having an approximate film thickness of about 2 mils from a zine ale cast substrate. The coating included a clear 7.5 mil film overcoat on a 0.5 mil pigmented film undercoat.

| Component | Grams per liter |
| --- | --- |
| Lignosulfonate | 3.5 |
| Caustic Potash (45%) | 35.0 |
| Sodium Silicate (40%) | 170.0 |
| Tetra Sodium Salt of EDTA | 5.5 |

| Component | Grams per liter |
| --- | --- |
| Sodium Gluconate | 13.0 |
| Ethoxylated Furfuryl Alcohol | 11.0 |
| 2-Phenoxy Ethanol | 100.0 |
| Water | Balance |

The coated cast parts were contacted in the stripping bath of this composition at a rolling boil at 220 degrees F. for approximately one hour.

Both the clear polyurethane overcoat and the pigmented polyurethane undercoat were completely removed and the zinc die cast part was preserved without damage for re-use.

Prior to the present invention, conventional stripping compositions were used and the zinc parts were contacted at least 8 and up to 12 hours. The clear polyurethane upper coat was removed after rinsing, however, the pigmented undercoat was only softened and hand brushing was required to remove the undercoat.

EXAMPLE II

The same zinc cast part having the same polyurethane coatings and the same bath composition as used in Example I were tested at 180 degrees F. conditions. The di-phase composition was agitated by air sufficient to finely disperse the 2-phenoxy ethanol solvent phase into the alkaline aqueous phase. The coated parts were contacted with the dispersed, agitated stripping bath for approximately one hour. Essentially equivalent results to those in Example I were obtained and the coating was completely removed from the zinc substrates.

EXAMPLE III

The formulation and operating conditions outlined in Examples I and II were also used successfully to remove a variety of organic coatings from aluminum alloys and brass alloys.

EXAMPLE IV

The following di-phase composition was used for removal of a 3 to 4 mil powder polyester coating from zinc di-cast and aluminum di-cast parts at 180 degrees F. with air agitation having contact times ranging from one (1) to two (2) hours. Other prior products used for this application required a minimum of four (4) hours.

| Component | Grams per Liter |
| --- | --- |
| Lignosulfonate | 5.0 |
| Caustic Potash (45%) | 50.0 |
| Sodium Silicate (40%) | 240.0 |
| Tetrasodium Salt of EDTA | 8.0 |
| Sodium Gluconate | 20.0 |
| Ethoxylated Furfuryl Alcohol | 11.0 |
| 2-Phenoxy Ethanol | 100.00 |
| Water | Balance |

In Examples I, II, III and IV sufficient sodium silicate was used in the formulation to prevent attack of the non-ferrous substrate metal by the active stripping ingredients.

EXAMPLE V

For ferrous metals, the following composition has been tested for removal of organic coatings such as referred to herein with excellent results, using the same temperature and agitation methods outlined in Examples I and II above.

| Component | Grams per liter |
| --- | --- |
| Lignosulfonate | 4.0 |
| Caustic Potash (45%) | 270.0 |
| Sodium Gluconate | 13.0 |
| Ethoxylated Furfuryl Alcohol | 11.0 |
| 2-Phenoxy Propanol | 100.00 |
| Water | Balance |

EXAMPLE VI

The same formulation as used in Example I was employed in a conventional recirculating spray chamber. The spray pressure was 15 pounds per square inch, gauge pressure. The di-phase formulation in the chamber bath was impinged upon the photo resist coatings on copper circuit boards and very efficiently removed all of the coating.

The volume of the spray chamber in this Example was sufficiently small relative to the capacity of the recirculation apparatus that there was adequate agitation to maintain a good dispersion of the two phases spray impinged upon the coated parts. In other circumstances, supplementary agitation of the di-phase bath in the chamber reservoir may be required to obtain satisfactory results in accordance with the present invention. Prior to the present invention, removal of such photo-resist coatings by spraying could be economically accomplished only using a standard chlorinated solvent with the attendant environmental and waste disposal disadvantages.

EXAMPLE VII

The di-phase composition listed below was employed to remove a vacuum metallized coating from steel parts having a typical paint overcoat. The combined thickness of the metallized coat and paint coat was at least 5 mils on some samples and at least 10 mils on others.

| Component | Grams per liter |
| --- | --- |
| Water | 300 |
| Potassium hydroxide (45%) | 550 |
| Diglycolamine | 15 |
| Gluconic Acid | 45 |
| Ethoxylated furfuryl alcohol | 90 |

The coated parts were contacted in a stripping bath having the above formulation at a rolling boil at 220 degrees F. for 6 minutes. The paint and vacuumized metallic coatings were completely removed. In comparison, a prior art commercial aqueous alkaline phase stripping composition including ethoxylated furfuryl alcohol and 2-phenoxy ethanol coupled into the aqueous alkaline solution was significantly less effective, leaving approximately 20 percent or more of the coatings on the parts after immersion for 12 minutes under the same conditions.

It should be pointed out that it is essential to maintain a good dispersion of the solvent phase in the aqueous phase during the time the coated substrate is in contact with stripping bath. With most difficult to remove organic coatings, the addition of alkaline components, surfactants and wetting agents improve the efficiency of the stripping action to a degree similar to that noted in prior conventional compositions.

Further, non-ionic wetting agents or other conventional additives which may be employed in formulations in accordance with the present invention should not exceed amounts which tend to couple the organic solvent into solution with the aqueous alkaline phase. This would lessen the effectiveness of the stripping action and respresents a waste of the relatively more expensive organic solvent.

The preferred glycol phenol ethers for use in the present invention are 2-phenoxy ethanol or 2-phenoxy propanol since they are readily available commercially. Ethoxylated furfuryl alcohols are also readily commercially available. However, these are best employed with aqueous alkaline solutions having at least 20 to 50 percent alkaline concentrations since ethoxylated furfuryl alcohol has a significant degree of solubility in aqueous solutions having low alkaline concentrations.

In accordance with the present invention, since the organic solvent phase which is not solubilized into the aqueous phase contributes to the surprising increase in stripping effectiveness, any formulation which results in any significant coupling of the ethoxylated furfuryl alcohol or glycol phenol ether into the alkaline aqueous phase is undesirable and reduces the stripping efficiency accordingly or represents an unnecessary cost by effectively wasting a relatively expensive component.

Formulations for use in accordance with the present invention may be marketed in a form wherein the organic solvent phase is supplied to the customer as an additive to an alkaline aqueous composition obtained by the customer from other sources and then formulated in the working stripping bath in accordance with the teaching of the present invention.

For convenience of the customer in certain applications, the organic phase may be provided with other additives which will form part of the aqueous solution when the alkaline and organic phases are mixed.

For example, in the formulation noted in Example VII, diglycolamine and gluconic acid, may be included in a solution with ethoxylated furfuryl alcohol. A relatively small amount of an organic coupling agent such as propylene glycol may be included to solubilize the diglycolamine and gluconic acid in the ethoxylated furfuryl alcohol merely for the purpose of providing a homogenous solution for ease of customer handling as an additive to the aqueous alkaline phase. When the organic solvent phase additive is mixed with the aqueous alkaline phase, the gluconic acid and diglycolamine are solubilized into the aqueous phase and form a part thereof at appropriate concentrations for the application while the ethoxylated furfuryl alcohol separates and forms the organic solvent phase.

However, it is important to point out that the amount of the coupling agent, such as propylene glycol, is not so great to couple any appreciable amount of the ethoxylated furfuryl or the glycol phenol ether into the aqueous solution consistent with maintaining the true diphase stripping action as taught herein.

In this manner, the customer merely adds a relatively small portion of the additive containing the organic solvent to the prescribed aqueous alkaline composition. Then these conventional components, such as digycolamine and gluconic acid, are present in the aqueous phase in proper measured amounts, in addition to the separate organic solvent phase for use according to the teachings of the present invention.

What is claimed is:

1. A method of stripping organic coatings from a coated substrate comprising the steps of subjecting said coated substrate to a two-phase liquid bath for a predetermined time, said bath comprising an organic solvent phase dispersed in an aqueous phase, said phases being relatively insoluble in one another; and agitating said liquid bath to maintain a relatively uniform state of dispersion of said organic phase in said aqueous phase and maintaining the two-phase relationship between said organic and aqueous phases in said dispersed state; said organic solvent phase comprising one or more components taken form a group consisting of glycol phenol ethers and ethoxylated furfuryl alcohol.

2. The method defined in claim 1 wherein agitation of said bath is effected by heating said 2-phase liquid formulation to a rolling boil.

3. The method defined in claim 1 wherein agitation of said bath is effected by introduction of air or other mechanical mixing means.

4. The method defined in claim 1 wherein said aqueous phase includes one or more alkaline constituents.

5. The method defined in claim 4 wherein said organic phase comprises at least 5 to 40 percent by weight of the total combination of both phases.

6. The method defined in claim 4 wherein the said separate organic phase comprises 5 to 20 percent by weight of the total weight of both the organic and aqueous phases.

* * * * *